UNITED STATES PATENT OFFICE.

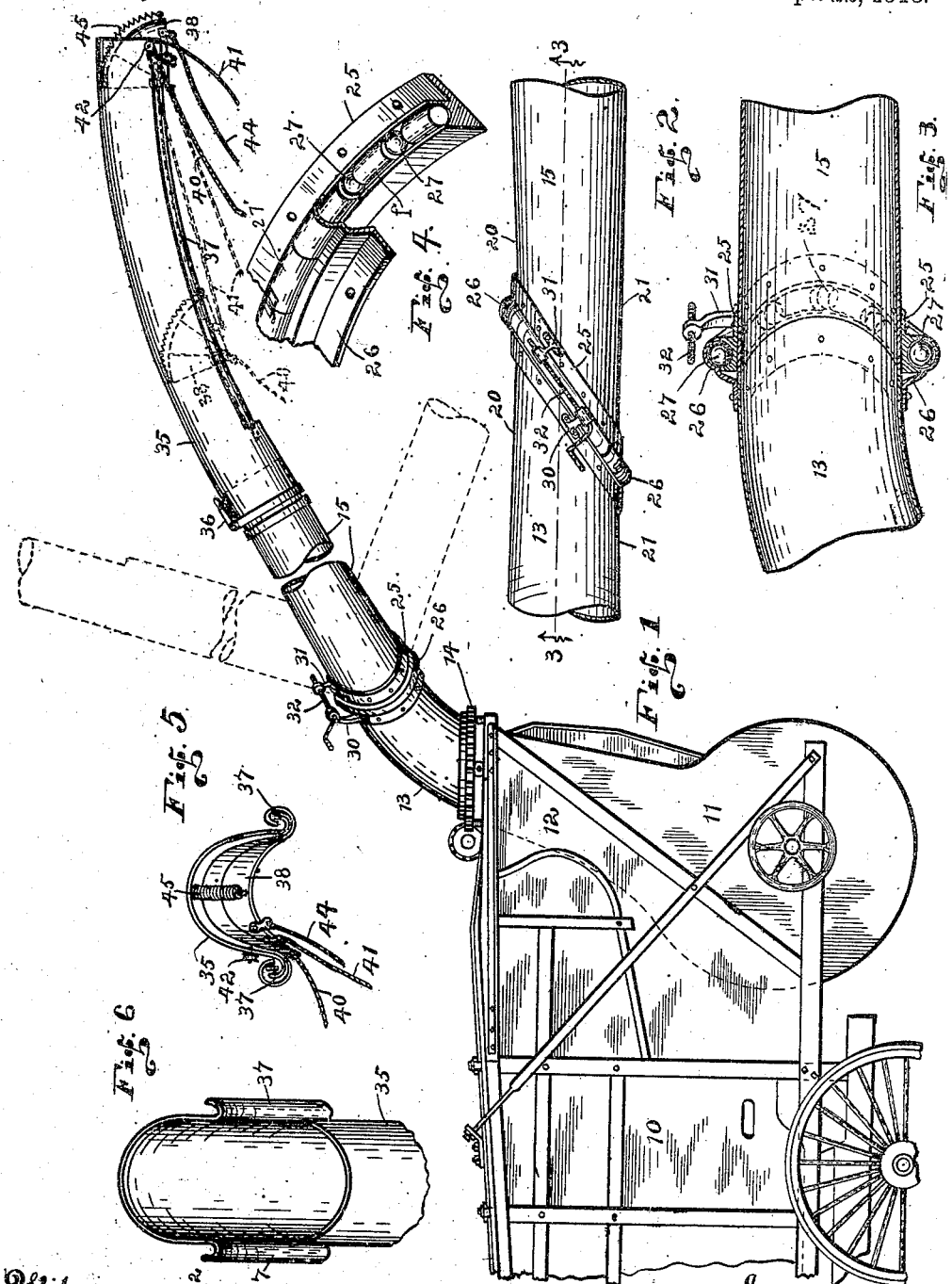

GEORGE F. CONNER, OF PORT HURON, MICHIGAN, ASSIGNOR TO THE INDIANA MANUFACTURING COMPANY, OF INDIANAPOLIS, INDIANA, A CORPORATION OF WEST VIRGINIA.

PNEUMATIC STACKER.

1,059,658.  Specification of Letters Patent.  Patented Apr. 22, 1913.

Application filed October 8, 1909.  Serial No. 521,647.

*To all whom it may concern:*

Be it known that I, GEORGE F. CONNER, a citizen of the United States, residing at Port Huron, in the county of St. Clair and State of Michigan, have invented certain new and useful Improvements in Pneumatic Stackers, of which the following is a specification.

Pneumatic stacker chutes as commonly constructed comprise a stump or elbow upon which the main discharge chute is telescopically mounted so that the latter may be elevated or lowered as desired, and such chutes are also made in two sections, the outer section being telescopically mounted on the inner so that the chute as a whole may be decreased or increased in length to discharge material at desired distances.

The object of my invention is to dispense with such a chute as indicated and provide a non-telescopic chute capable of vertical movement without the employment of a sliding elbow joint, and one by which material may be discharged at varying distances, all as will hereinafter more fully appear.

In the accompanying drawings, which form a part hereof, Figure 1 is a side elevation of a threshing or similar machine in fragment with a pneumatic stacker embodying my improvement combined therewith; Fig. 2 a plan of my improved rotary raising and lowering device connecting two chute sections, which latter are shown in fragment; Fig. 3 a longitudinal sectional view on the dotted lines 3—3 in Fig. 2; Fig. 4 a detail section of the rotary device showing the ball bearing joint therein; Fig. 5 an end view showing the sliding hood or deflector which I employ; and Fig. 6 an under plan of a portion of the chute with the hood removed.

In said drawing the portions marked 10 represent the separator, 11 the stacker fan with outlet 12 leading to the stacker chute, the inner curved portion 13 of which chute may be revolubly mounted upon a turn table, as 14, of any suitable construction so that the chute as a whole may be swung horizontally. Chute section 15 is vertically adjustably mounted upon the outer end of the inner section 13 by means of an angularly positioned turning device by which said outer section may be raised and lowered as desired.

As will be readily understood, when a tubular structure is cut at an angle the end thereof is of elliptical form, and under such circumstances two chute sections such as shown could not be jointed movably in relation to each other and the constant peripheral registry thereof maintained. In order, therefore, to produce substantially true circularity of the abutting ends of these sections I distort the material somewhat by forming shallow dents in opposite sides thereof, as at 20—21, which enables me to flare the elliptical ends thereof an equal amount on top and bottom to cause them to assume a circular formation, and by such arrangement the area and capacity of the chute at this point are the same as at other portions thereof. In this condition the ends of the chute sections 13, 15, are adapted to be connected by means of the movable joint comprising the band 25 which is secured to section 15 and the overlapping band 26 which is secured to section 13, the connecting portions of said bands forming a ball race, in which balls 27 separated by suitable fillers $f$ may be introduced through an opening provided with an adjustable cover 27', and which ball bearing arrangement has a binding effect upon said bands. Bands 25, 26, are provided with suitable brackets 30, 31, in which is mounted a screw threaded crank 32 by which the outer section may be rotatably moved on said inner section, and which connection further insures that said bands are at all times securely jointed. Said section 15 may be an integral structure to its outer end or may be in two sections the outer section 35 telescoping upon and clamped to said section 15 by a suitable clamp as 36. The chute in its entirety from turntable 14 to its outer end is curved slightly as indicated in Fig. 1, and the under side of its outer portion is cut away for a considerable portion of its length. The sides 37 of this cut away portion are turned upwardly substantially as indicated in Fig. 6, and in which sides I slidably secure an adjustable deflector or hood comprising collapsible sections 38 the sides of which are upturned to overlap said sides 37 as indicated in Fig. 5. Said hood is provided with a cord 40 by which the same may be drawn inwardly to any desired point along the chute, as for instance as indicated by dotted lines in Fig. 1, and preferably near its outer end it has a cord 41 attached thereto which may be run over a suitable guide, as 42, at any desired point so that said hood may be drawn outwardly. The hood sections are normally held in extended position by cord 44, as will be readily understood, and are automatically collapsible by means of the spring 45.

In the operation of my improved stacker the chute may be swung laterally on its turntable in any desired manner, and because of its curvature from turntable to outer end, as indicated in Fig. 1, is highly efficient in that the natural tendency of the discharging material is to follow the upper side of the chute, and as the longitudinal curve thereof is gradual the material by its momentum substantially clings closely to the upper side of the chute until it is deflected by the movable hood 38, whereas in chutes as ordinarily constructed the curve above the turntable is very abrupt, and the chute being extended on a straight line the material when leaving the elbow and striking the upper side of the chute is deflected downwardly so that the oncoming material under varying velocities of the blast is being discharged in more or less irregular masses.

In starting a straw stack the chute is lowered by manipulating crank 32, which causes said chute to move downwardly on an approximately vertical line, and as the straw is being stacked the chute is gradually elevated by reversing the movement of said crank (lowered and raised positions of the chute being indicated by dotted lines in Fig. 1). As it is necessary to discharge the straw at various points on the stack near to and distant from the separator the traveling hood is suitably manipulated by the cords attached thereto to be drawn inwardly or outwardly to any desired point along the chute, as indicated in Fig. 1, and the deposit of the straw governed thereby. As will be readily understood, the chute is being swung laterally in either direction during this operation, and by controlling the deflection of the straw by the movable hood I am enabled to accomplish the same results as are attained by the use of telescopic chutes, and by the employment of a simple turning device angularly positioned in the chute as indicated I am enabled in a simple manner to raise and lower the chute in an approximately vertical plane sufficient for all practical purposes without the employment of a telescoping elbow and the supporting and operating devices ordinarily associated therewith.

I claim as my invention:

1. In a pneumatic stacker, the combination of an inner and an outer chute section, two bands one rotatable upon the other vertically and angularly positioned between said sections, a bracket on each of said bands, and means connecting said brackets whereby one of said bands may be rotated upon the other to cause one of said chute sections to be raised and lowered in a substantially vertical plane.

2. In a pneumatic stacker, the combination of an inner and an outer chute section, a vertically and angularly positioned rotary joint interposed between said chute sections, brackets on said rotary joint, and an adjustable crank connecting said brackets to rotate a portion of said rotary joint to elevate and lower its connected chute section in a substantially vertical plane.

3. In a pneumatic stacker, a rotary joint comprising two bands one rotatable upon the other and each provided with a bracket, and means connecting said brackets to rotate one of said bands upon the other.

4. In a pneumatic stacker, a vertically and angularly positioned rotary joint comprising bands, ball bearings mounted between said bands, brackets on said bands, and means connecting said brackets to rotate one of said bands.

5. A pneumatic stacker chute comprising sections the ends whereof are cut at an angle to the axis of said chute, flared to circular form and arranged vertically in relation to each other; circular bands connected to said sections and to each other and each provided with a bracket; and means connecting said brackets to rotate one of said bands upon the other to vertically adjust said chute.

GEORGE F. CONNER.

Witnesses:
L. H. REYNOLDS,
L. M. MILLER.